United States Patent
Lu et al.

(10) Patent No.: US 8,351,778 B2
(45) Date of Patent: Jan. 8, 2013

(54) METHOD FOR ADJUSTING BRIGHTNESS OF IMAGE

(75) Inventors: Chung-Pin Lu, New Taipei (TW); Yi-Yu Chen, Taipei (TW)

(73) Assignee: Altek Corporation, Hsinchu (TW)

(*) Notice: Subject to any disclaimer, the term of this patent is extended or adjusted under 35 U.S.C. 154(b) by 32 days.

(21) Appl. No.: 13/192,448

(22) Filed: Jul. 27, 2011

(65) Prior Publication Data

US 2012/0294599 A1    Nov. 22, 2012

(30) Foreign Application Priority Data

May 18, 2011    (TW) .............................. 100117430 A

(51) Int. Cl.
*G03B 15/03*    (2006.01)

(52) U.S. Cl. ...................................... 396/164

(58) Field of Classification Search .................. 396/164
See application file for complete search history.

(56) References Cited

U.S. PATENT DOCUMENTS

| | | | |
|---|---|---|---|
| 7,522,210 B2* | 4/2009 | Shimada ...................... 348/364 |
| 8,203,625 B2* | 6/2012 | Furuya et al. .............. 348/229.1 |
| 2002/0067422 A1* | 6/2002 | Miura et al. .................. 348/370 |
| 2007/0200938 A1* | 8/2007 | Kaku et al. .................... 348/239 |
| 2010/0200781 A1* | 8/2010 | Khorasani et al. ............ 250/576 |

* cited by examiner

*Primary Examiner* — Rodney Fuller
(74) *Attorney, Agent, or Firm* — Jianq Chyun IP Office

(57) ABSTRACT

A method for adjusting brightness of an image, suitable for an image capturing apparatus with a flash lamp, is provided. In the method, an intensity of a main flash of the flash lamp is raised, and a sensitivity is reduced. When the main flash is fired by the flash lamp, a raw image is captured according to the reduced sensitivity for calculating a brightness mean value. A gain ratio is calculated according to the brightness mean value and a brightness target, so as to use the gain ratio to compensate the brightness of the raw image.

7 Claims, 4 Drawing Sheets

METHOD FOR ADJUSTING BRIGHTNESS OF IMAGE

CROSS-REFERENCE TO RELATED APPLICATION

This application claims the priority benefit of Taiwan application serial no. 100117430, filed May 18, 2011. All disclosure of the Taiwan application is incorporated herein by reference.

BACKGROUND OF THE INVENTION

1. Field of the Invention

This invention is related generally to an image processing method, and more particularly to a method for adjusting brightness of an image.

2. Description of Related Art

In photography, an exposure operation is typically performed through an auto exposure function to achieve the ideal brightness for an entire image. When under insufficient ambient lighting or when the exposure time is below a safe shutter speed, a flash lamp is employed for brightness compensation so that the captured image does not become unrecognizable due to inadequate brightness.

With currently available techniques, the intensity of each flash of the flash lamp is different. Moreover, the stability of the flash lamp is determined by the magnitude of the capacitance. As the capacitor of the flash lamp reduces in size, a discharge stability thereof deteriorates. With inadequate discharge stability, variations in the brightness of each captured image is generated. Due to the nonlinearity of the capacitor discharge, even with a large capacitance, variations in the stability result because of different discharge durations. Accordingly, the deteriorated stability in the pre-flash and main flash adversely affects the brightness level of the captured image. Therefore, when capturing a plurality of images, the inadequate stability of the flash lamp results in inconsistent brightness levels for each output image.

Flash lamp compensation typically utilizes an auto exposure parameter and a pre-flash image to estimate the main flash intensity. In a conventional compensation method, a sensitivity is first reduced, then the image is captured, and a digital gain is adjusted thereafter to perform compensation. Although this method may compensate the image brightness, discontinuities in brightness occurs when capturing a plurality of images. Moreover, since a sensitivity target value is reduced, the time for flash power up is shortened. As the time for the flash lamp to energize impacts the stability of the image, the shorter the time, the more unstable the image. For example, FIG. 1 is a schematic diagram of a brightness distribution after undergoing a conventional brightness compensation. In FIG. 1, the sensitivity is reduced to darken the image, and the digital gain is raised thereafter to perform compensation. As shown in FIG. 1, the compensation result improves as the expected image brightness reduces, although the discontinuity phenomenon becomes more apparent.

SUMMARY OF THE INVENTION

The invention provides a method for adjusting brightness of an image, such that an image capturing apparatus has preferable continuity in brightness distribution when shooting a plurality of images.

The invention provides a method for adjusting brightness in an image, suitable for an image capturing apparatus with a flash lamp. In the method for adjusting brightness, an intensity of a main flash of the flash lamp is raised, and a sensitivity is reduced according to the raised intensity of the main flash. Moreover, a percentage of the raised intensity of the main flash and a percentage of the reduced sensitivity matches a predetermined proportion. When the main flash is fired by the flash lamp, a raw image is captured according to the reduced sensitivity, so as to calculate a brightness mean value of the raw image. Furthermore, a gain ratio is calculated according to the brightness mean value and a brightness target, and the brightness of the raw image is compensated according to the gain ratio.

According to an embodiment of the invention, before raising the intensity of the main flash of the flash lamp, an auto exposure parameter is first obtained, and a pre-flash image is captured when the flash lamp fires a pre-flash. An output time of the main flash is calculated according to the auto exposure parameter and the pre-flash image. The intensity of the main flash is calculated according to the auto exposure parameter and the pre-flash image. Moreover, after calculating the intensity of the main flash, the intensity of the main flash is raised according to a capacitor stability of the flash lamp.

According to an embodiment of the invention, after compensating the brightness of the raw image according to the gain ratio, the raw image is transformed into a compressed image. For example, the raw image is transformed into a Joint Photographic Experts Group (JPEG) image through an Image Reproduction Pipeline (IRP).

According to an embodiment of the invention, the method of adjusting brightness further includes determining whether to turn on the flash lamp, so that the afore-described method of adjusting brightness may be executed when the flash lamp of the image capturing apparatus is in a turned on state.

In summary, according to embodiments of the invention, the intensity of the main flash is raised and the sensitivity is reduced to capture the raw image. The gain ratio is determined according to the brightness target, and the brightness of the raw image is compensated according to the gain ratio. Accordingly, not only is the image stability of the flash lamp enhanced, the brightness of a plurality of images has a preferable continuity.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Typically, when under insufficient ambient lighting or when the exposure time is below a safe shutter speed, a flash lamp is employed for brightness compensation. However, inadequate stability of the flash lamp results in inconsistent brightness levels of each output image. Accordingly, the invention provides a method for adjusting brightness of an image, in which the flash lamp maintains in a stable state, and brightness compensation is also performed. In order to make the invention more comprehensible, embodiments are described below as the examples to prove that the invention can actually be realized.

Figure 1:
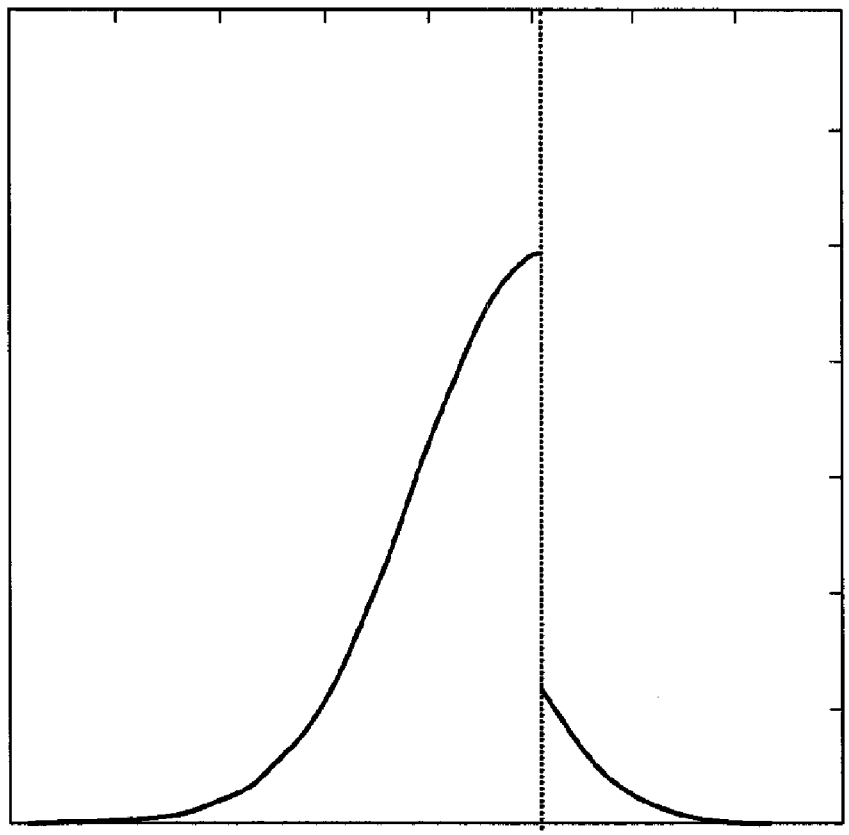
FIG. 1 is a schematic diagram of a brightness distribution after undergoing a conventional brightness compensation.
Figure 2:
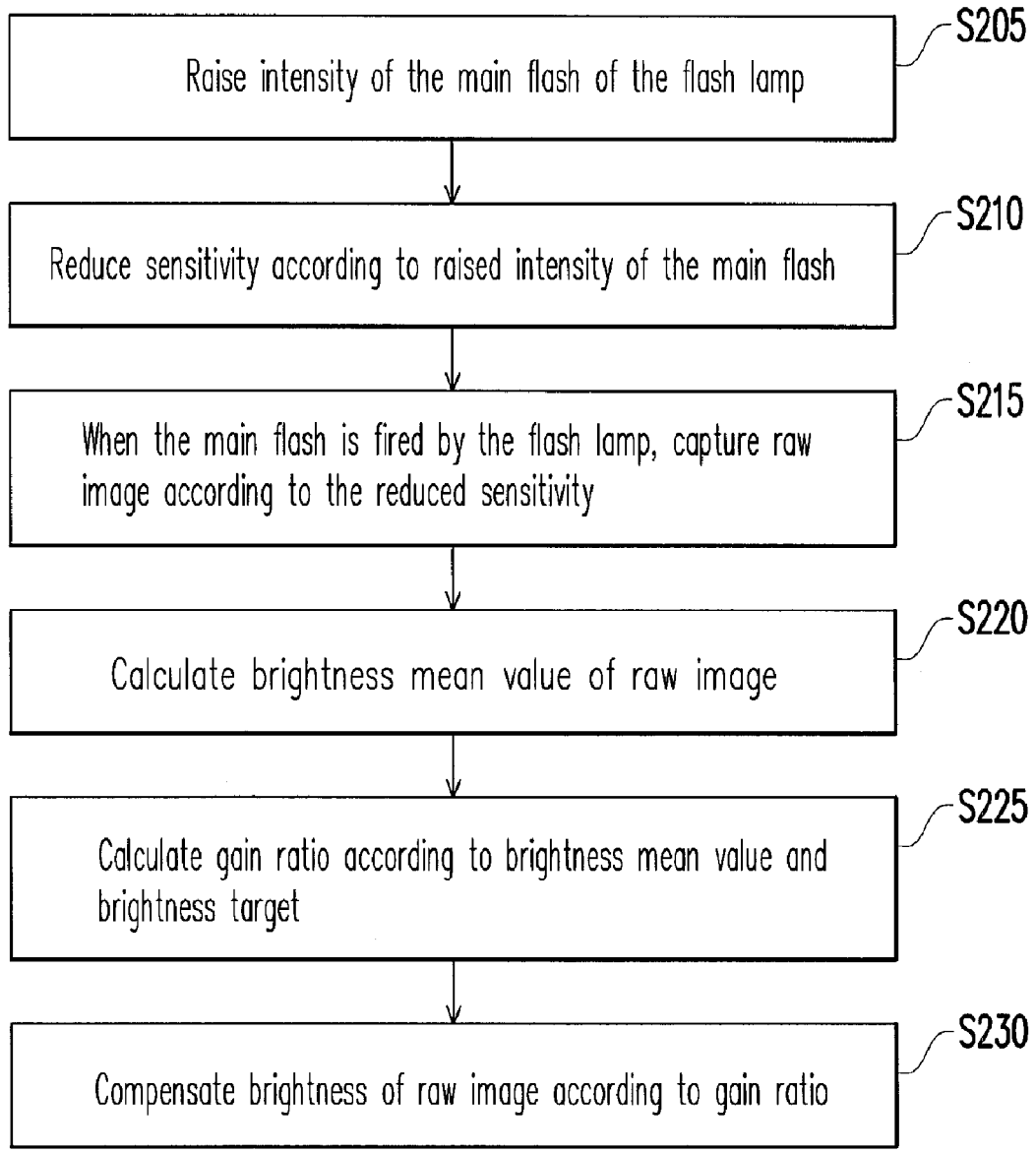
FIG. 2 is a flowchart of a method for adjusting brightness of an image according to an embodiment of the invention.

FIG. 2 is a flowchart of a method for adjusting brightness of an image according to an embodiment of the invention. In the present embodiment, a method for adjusting brightness of an image may be applied in an image capturing apparatus (not drawn) having a processing unit executing the steps of adjusting image brightness. The image capturing apparatus may be a digital camera or a cellular phone with a photography function, although the invention is not limited thereto.

Referring to FIG. 2, in a Step S205, an intensity of a main flash of a flash lamp is raised. For example, the intensity of the main flash is raised according to a capacitor stability of the flash lamp. In a Step S210, a sensitivity is reduced according to the raised intensity of the main flash. Moreover, a percentage of the raised intensity of the main flash and a percentage of the reduced sensitivity matches a predetermined proportion. For example, when the intensity of the main flash is raised by 10%, then the sensitivity is reduced by 20%. Assuming an original sensitivity of the image capturing apparatus is set at 100, for instance, when the intensity of the main flash is raised by 10%, the sensitivity is reduced to 80.

In a Step S215, when the main flash is fired by the flash lamp, a raw image is captured according to the reduced sensitivity. In other words, although the sensitivity of the image capturing apparatus is set at 100, the raw image is captured with sensitivity at 80 at the time of photo shoot.

After capturing the raw image, a brightness mean value of the raw image is calculated, as shown in a Step S220. In a Step S225, a gain ratio is calculated according to the brightness mean value and a brightness target. Gain ratio may be defined as gain ratio=brightness target/brightness mean value. Furthermore, assuming the sensitivity is originally set at 100 and then reduced to 80, then the gain ratio can compensate at most 1.25 (100/80) times.

In a Step S230, the brightness of the raw image is compensated according to the gain ratio. For example, with a gain ratio of 1.1, the brightness of the entire raw image is multiplied by 1.1.

Figure 3:
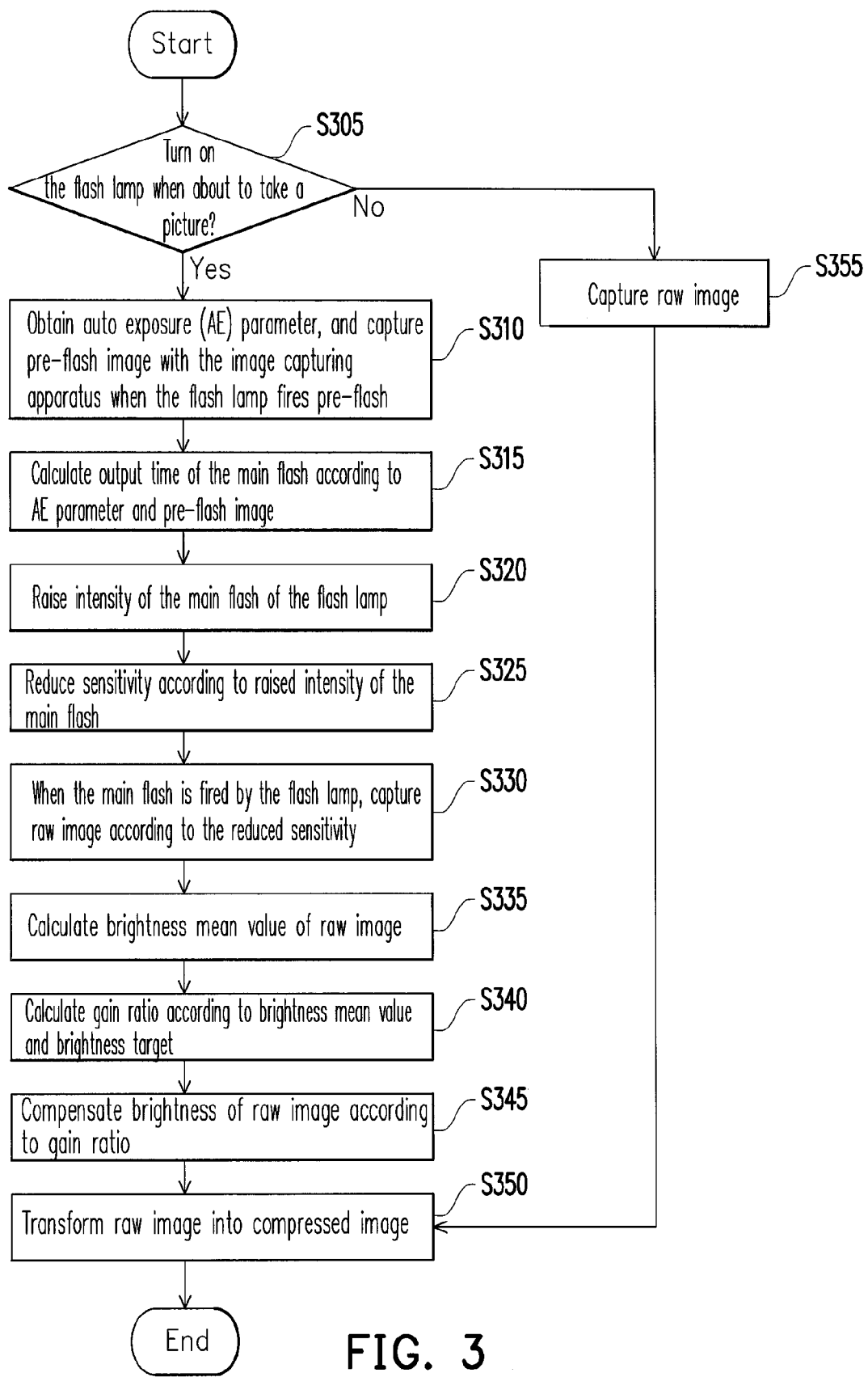
FIG. 3 is a flowchart of a method for adjusting brightness of an image according to another embodiment of the invention.

Another example is described below to illustrate a process flow of the image capture. FIG. 3 is a flowchart of a method for adjusting brightness of an image according to another embodiment of the invention. Referring to FIG. 3, in a Step 305, whether to turn on the flash lamp is determined when a user is about to take a picture. For example, the image capturing apparatus may determine whether to turn on the flash lamp according to an ambient light source. Alternatively, the user may set the flash lamp to turn on by configuring the photo parameters of the image capturing apparatus.

When turning on the flash lamp, a Step S310 is executed to obtain an auto exposure (AE) parameter, and a pre-flash image is captured when the flash lamp fires a pre-flash. In a Step S315, an output time (i.e., a flash duration) of the main flash is calculated according to the AE parameter and the pre-flash image. Moreover, the intensity of the main flash is calculated according to the AE parameter and the pre-flash image. Typically speaking, before firing the main flash, a pre-flash of lower power is first fired to perform pre-flashing. A reflectivity of an anticipated object is determined according to the pre-flash and the AE parameter. Accordingly, the intensity and the output time of the main flash are determined.

After calculating the output time and the intensity of the main flash, in a Step S320, the intensity of the main flash of the flash lamp is raised. In a Step S325, the sensitivity is reduced according to the raised intensity of the main flash. Moreover, in a Step S330, when the main flash is fired by the flash lamp, a raw image is captured according to the reduced sensitivity. A brightness mean value of the raw image is calculated, as shown in a Step S335. In a Step S340, a gain ratio is calculated according to the brightness mean value and a brightness target. In a Step S345, the brightness of the raw image is compensated according to the gain ratio. Steps S320 to 345 are substantially the same as Steps S205 to S230, therefore further description is omitted hereafter.

In a Step S350, the raw image is transformed into a compressed image. For example, the raw image is transformed into a Joint Photographic Experts Group (JPEG) image through an Image Reproduction Pipeline (IRP).

Returning to Step S305, when the flash lamp is not turned on, a Step S355 is executed to directly capture the raw image and to transform the raw image into the compressed image, as shown in the Step S350.

Figure 4:
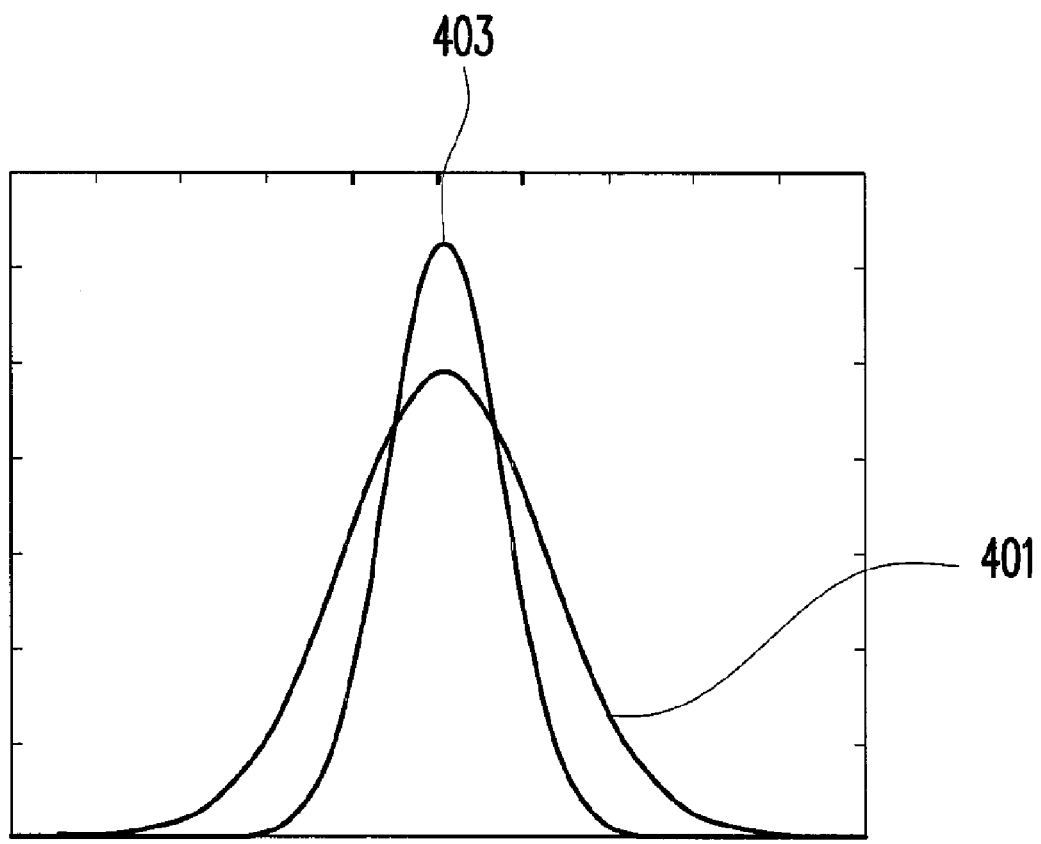
FIG. 4 is a schematic diagram of an image brightness distribution according to an embodiment of the invention.

Another example is described below to illustrate the improved results from adopting the aforementioned method. FIG. 4 is a schematic diagram of an image brightness distribution according to an embodiment of the invention. Referring to FIG. 4, a curve 401 represents a brightness distribution of the raw image without adjustment, and a curve 403 represents a brightness distribution of the raw image after adjustment. As shown in FIG. 4, after undergoing brightness adjustment, the brightness distribution becomes concentrated and continuous.

In view of the foregoing, according to embodiments of the invention, the intensity of the main flash is raised and the sensitivity is reduced to capture the raw image. The gain ratio is determined according to the brightness target, and the brightness of the raw image is compensated according to the gain ratio. Moreover, due to the reduced sensitivity at the time of image capture, even after compensating the brightness of the raw image according to the gain ratio, the sensitivity thereof would not surpass the original setting. Accordingly, the image stability of the flash lamp is enhanced while the factors contributing to hardware instability are reduced, thereby resulting in the preferable continuity of the brightness distribution for a plurality of images. Furthermore, even when the sensitivity is ultimately compensated, due to the reduced sensitivity, the compensated sensitivity would not be higher than the original setting, and accordingly noise signals are effectively suppressed.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for adjusting brightness of an image, suitable for an image capturing apparatus with a flash lamp, the method comprising:

raising an intensity of a main flash of the flash lamp;

reducing a sensitivity according to the raised intensity of the main flash, wherein a percentage of the raised intensity of the main flash and a percentage of the reduced sensitivity matches a predetermined proportion;

when the main flash is fired by the flash lamp, capturing a raw image according to the reduced sensitivity;

calculating a brightness mean value of the raw image;

calculating a gain ratio according to the brightness mean value and a brightness target; and compensating the brightness of the raw image according to the gain ratio.

2. The method for adjusting brightness as claimed in claim 1, wherein before the step of raising the intensity of the main flash of the flash lamp, the method further comprises:
   obtaining an auto exposure parameter and capturing a pre-flash image when the flash lamp fires a pre-flash; and
   calculating an output time of the main flash according to the auto exposure parameter and the pre-flash image.

3. The method for adjusting brightness as claimed in claim 2, wherein after the step of obtaining the auto exposure parameter and capturing the pre-flash image when the flash lamp fires the pre-flash, the method further comprises:
   calculating the intensity of the main flash according to the auto exposure parameter and the pre-flash image.

4. The method for adjusting brightness as claimed in claim 3, wherein the step of raising the intensity of the main flash of the flash lamp comprises:
   after calculating the intensity of the main flash, raising the intensity of the main flash according to a capacitor stability of the flash lamp.

5. The method for adjusting brightness as claimed in claim 1, wherein after the step of compensating the brightness of the raw image according to the gain ratio, the method further comprises:
   transforming the raw image into a compressed image.

6. The method for adjusting brightness as claimed in claim 5, wherein the step of transforming the raw image into the compressed image comprises:
   transforming the raw image into the compressed image through an Image Reproduction Pipeline (IRP).

7. The method for adjusting brightness as claimed in claim 1, further comprising:
   determining whether to turn on the flash lamp.

* * * * *